US006879876B2

(12) United States Patent
O'Dougherty et al.

(10) Patent No.: US 6,879,876 B2
(45) Date of Patent: Apr. 12, 2005

(54) LIQUID HANDLING SYSTEM WITH ELECTRONIC INFORMATION STORAGE

(75) Inventors: Kevin T. O'Dougherty, Arden Hills, MN (US); Robert E. Andrews, Hudson, MA (US)

(73) Assignee: Advanced Technology Materials, Inc., Danbury, CT (US)

(*) Notice: Subject to any disclaimer, the term of this patent is extended or adjusted under 35 U.S.C. 154(b) by 0 days.

(21) Appl. No.: 09/880,472

(22) Filed: Jun. 13, 2001

(65) Prior Publication Data

US 2002/0189667 A1 Dec. 19, 2002

(51) Int. Cl.7 .............................................. G06F 17/00
(52) U.S. Cl. ..................... 700/231; 700/239; 700/244; 700/265; 700/266; 700/281; 700/282; 700/283; 700/285; 73/866.5
(58) Field of Search .............................. 700/105, 110, 700/230, 231, 239, 244, 265–273, 281–283, 285; 73/866.5; 174/47; 137/177, 251.1, 798; 455/66

(56) References Cited

U.S. PATENT DOCUMENTS

| | | | | |
|---|---|---|---|---|
| 4,951,512 A | * | 8/1990 | Mazza et al. ............ 73/864.23 |
| 5,385,060 A | * | 1/1995 | Wang ....................... 73/866.5 |
| 5,524,794 A | | 6/1996 | Benedetti, Jr. et al. . 222/153.14 |
| 5,539,188 A | * | 7/1996 | Fallah et al. .............. 235/375 |
| 5,558,083 A | * | 9/1996 | Bathe et al. ............ 128/203.12 |
| 5,594,162 A | * | 1/1997 | Dolan et al. ................ 73/46 |
| 5,604,681 A | * | 2/1997 | Koeninger ................. 700/285 |
| 5,635,652 A | * | 6/1997 | Beaudin .................. 73/863.03 |
| 5,638,285 A | | 6/1997 | Newton ................. 364/479.11 |
| 5,737,221 A | | 4/1998 | Newton ................. 364/424.07 |
| 5,744,696 A | * | 4/1998 | Wang et al. .............. 73/23.25 |
| 5,802,859 A | * | 9/1998 | Zugibe ..................... 62/125 |
| 5,803,673 A | | 9/1998 | Reinsch et al. ............ 406/31 |
| 5,875,921 A | | 3/1999 | Osgar et al. ................ 222/1 |
| 5,883,376 A | * | 3/1999 | Rosch et al. .............. 235/375 |
| 5,893,263 A | * | 4/1999 | Matsumoto et al. ........ 156/387 |
| 5,940,780 A | * | 8/1999 | Azar et al. ................. 702/91 |
| 5,942,980 A | * | 8/1999 | Hoben et al. .............. 340/618 |
| 5,949,049 A | * | 9/1999 | McCarrick et al. ......... 235/375 |
| 5,953,682 A | * | 9/1999 | McCarrick et al. ......... 235/375 |
| 5,955,684 A | * | 9/1999 | Gravel et al. ............. 73/866.5 |
| 6,065,638 A | * | 5/2000 | Terranova et al. ........... 222/1 |
| 6,067,844 A | * | 5/2000 | Westbrook et al. ...... 73/40.5 R |

(Continued)

FOREIGN PATENT DOCUMENTS

| | | | | | |
|---|---|---|---|---|---|
| EP | WO 00/54724 | * | 9/2000 | ............ A61J/3/00 |
| JP | 2002181296 A | * | 6/2002 | ............ F17C/13/02 |
| JP | 2003139864 A | * | 5/2003 | ............ G01V/3/00 |

OTHER PUBLICATIONS

Philips Semiconductors, mifare System Overview, Dec. 1998.

Philips Semiconductors, Controllers for High Security, Crypto and Dual Interface Smart Cards, Mar. 1999.

*Primary Examiner*—Donald P. Walsh
*Assistant Examiner*—Jeffrey A. Shapiro
(74) *Attorney, Agent, or Firm*—Margaret Chappuis; Steven Hultquist, Esq.

(57) ABSTRACT

The present invention is a system for handling liquid and a method for the same. The system has a container capable of holding a liquid. An electronic storage device is coupled with the container for electronically storing information relating to the liquid stored in the container. The system also has an antenna, for storing information to and reading information from the electronic storage device. Finally, the system has a microprocessor-based controller, coupled with the antenna, for controlling processing of the liquid based on information read from the electronic storage device by the antenna.

26 Claims, 4 Drawing Sheets

U.S. PATENT DOCUMENTS

| | | | | |
|---|---|---|---|---|
| 6,140,146 A | * | 10/2000 | Brady et al. | 438/62 |
| 6,147,662 A | * | 11/2000 | Grabau et al. | 343/895 |
| 6,161,706 A | * | 12/2000 | Mc Cord | 211/85.18 |
| 6,206,240 B1 | | 3/2001 | Osgar et al. | 222/39 |
| 6,209,592 B1 | * | 4/2001 | Gilboa et al. | 141/94 |
| 6,271,753 B1 | * | 8/2001 | Shukla | 340/545.6 |
| 6,282,458 B1 | * | 8/2001 | Murayama et al. | 422/108 |
| 6,318,568 B1 | * | 11/2001 | Mc Cord | 211/85.18 |
| 6,405,745 B1 | * | 6/2002 | Kar et al. | 137/2 |
| 6,516,249 B1 | * | 2/2003 | Hoyle et al. | 700/282 |
| 6,542,848 B1 | * | 4/2003 | Neeser et al. | 702/156 |
| 6,545,592 B1 | * | 4/2003 | Weiner | 368/10 |
| 6,556,027 B1 | * | 4/2003 | Banks | 324/700 |
| 6,556,889 B1 | * | 4/2003 | Rudick et al. | 700/244 |
| 6,571,151 B1 | * | 5/2003 | Leatherman | 700/282 |
| 6,592,043 B1 | * | 7/2003 | Britton | 235/492 |
| 6,597,175 B1 | * | 7/2003 | Brisco | 324/326 |
| 6,618,714 B1 | * | 9/2003 | Abrahams | 706/45 |
| 6,649,829 B1 | * | 11/2003 | Garber et al. | 174/47 |
| 6,672,341 B1 | * | 1/2004 | Bartholomew et al. | 141/18 |

* cited by examiner

LIQUID HANDLING SYSTEM WITH ELECTRONIC INFORMATION STORAGE

CROSS-REFERENCE TO RELATED APPLICATION(S)

None.

BACKGROUND OF THE INVENTION

This invention relates to a storage and dispensing system for the storage and dispensing of liquids. In particular, the invention relates to using a radio frequency identification tag and a radio frequency antenna to assure proper association of a particular liquid to a particular process.

Certain manufacturing processes require the use of liquid chemicals such as acids, solvents, bases, photoresists, dopants, inorganic, organic and biological solutions, pharmaceuticals, and radioactive chemicals. Often, these processes require a specific liquid chemical for each particular process. Furthermore, each process may require a specific liquid chemical at various stages of the process. Storage and dispensing systems allow alternative containers to be used to deliver liquid chemicals to a manufacturing process at a specified time. Consequently, manufacturing personnel need to change the liquid chemical being used for the particular process at the specified time so that the system delivers the correct liquid chemical to the manufacturing process. It is critical that the proper liquid chemical be installed into the systems for the particular process. If the incorrect liquid chemical is installed for a particular process, personnel may be put at risk. Furthermore, equipment and the articles under manufacture may be severely damaged.

Prior art systems have attempted to utilize unique pump connectors that will only fit with a correct container. Each container has a unique configuration based on the liquid chemical contained therein. The intention is that only the correct chemical can be used in any particular manufacturing process, because the process will dictate a unique pump connection and a corresponding container with the correct chemical liquid. One example of such a system is disclosed in Osgar et al., "Liquid Chemical Dispensing System With Sensor," U.S. Pat. No. 5,875,921. The Osgar system uses physical configurations, called key codes, to prevent accidental dispensing of an improper liquid from a container. Both the container and a connector have unique key code configurations. The connector must have the same key code configuration as the container for the connector to be properly coupled with the container. The Osgar system also employs a sensor that senses proper coupling of the connector to the container. When the sensor senses a proper coupling of the connector to the container, a pump is enabled. When the container and the connector are not properly coupled, the pump is disabled.

Some prior art systems, however, do allow the pump connectors to be partially connected to the incorrect chemicals such that pumping can take place even though the connection is not proper. In addition, personnel have a propensity to attach the wrong chemical to the wrong process or at the wrong time. Such incorrect connections can be dangerous to personnel and have caused millions of dollars of damage to equipment and to articles of manufacture. A system that could provide a reliable connection between the correct chemical and the correct process, and that could track incorrect connection attempts by personnel would be a useful improvement over the prior systems.

SUMMARY OF THE INVENTION

The present invention is a system for handling liquid and a method for the same. The system has a container capable of holding a liquid. A storage means is coupled with the container for electronically storing information relating to the liquid stored in the container. The system also has a communication means, for storing information to and reading information from the storage means. Finally, the system has a controller means, coupled with the communication means, for controlling processing of the liquid based on information read from the storage means by the communication means.

In a preferred embodiment, a cap is also coupled with the opening such that the liquid is sealed in the container. A radio frequency identification (RFID) tag is mounted on the cap which is capable of electronically storing information. The RFID tag comprises a passive RF transponder and an electrically erasable programmable read-only memory (EEPROM). A connector is coupled with the cap such that the liquid can be dispensed from the container through the connector. A radio frequency (RF) antenna is mounted on the connector which stores information to and reads information from the EEPROM on the RFID tag. A microprocessor-based controller is coupled with the RF antenna such that the controller controls processing the liquid from the container based on information read from the RFID tag by the RF antenna.

In another preferred embodiment, the connector further comprises a connector head and a probe extending from the connector head. The probe is insertable through a center of the cap and into the opening. The probe has a flow passage. A pump is coupled with the probe and with the flow passage for pumping liquid through the probe and the flow passage.

DETAILED DESCRIPTION

Figure 1:
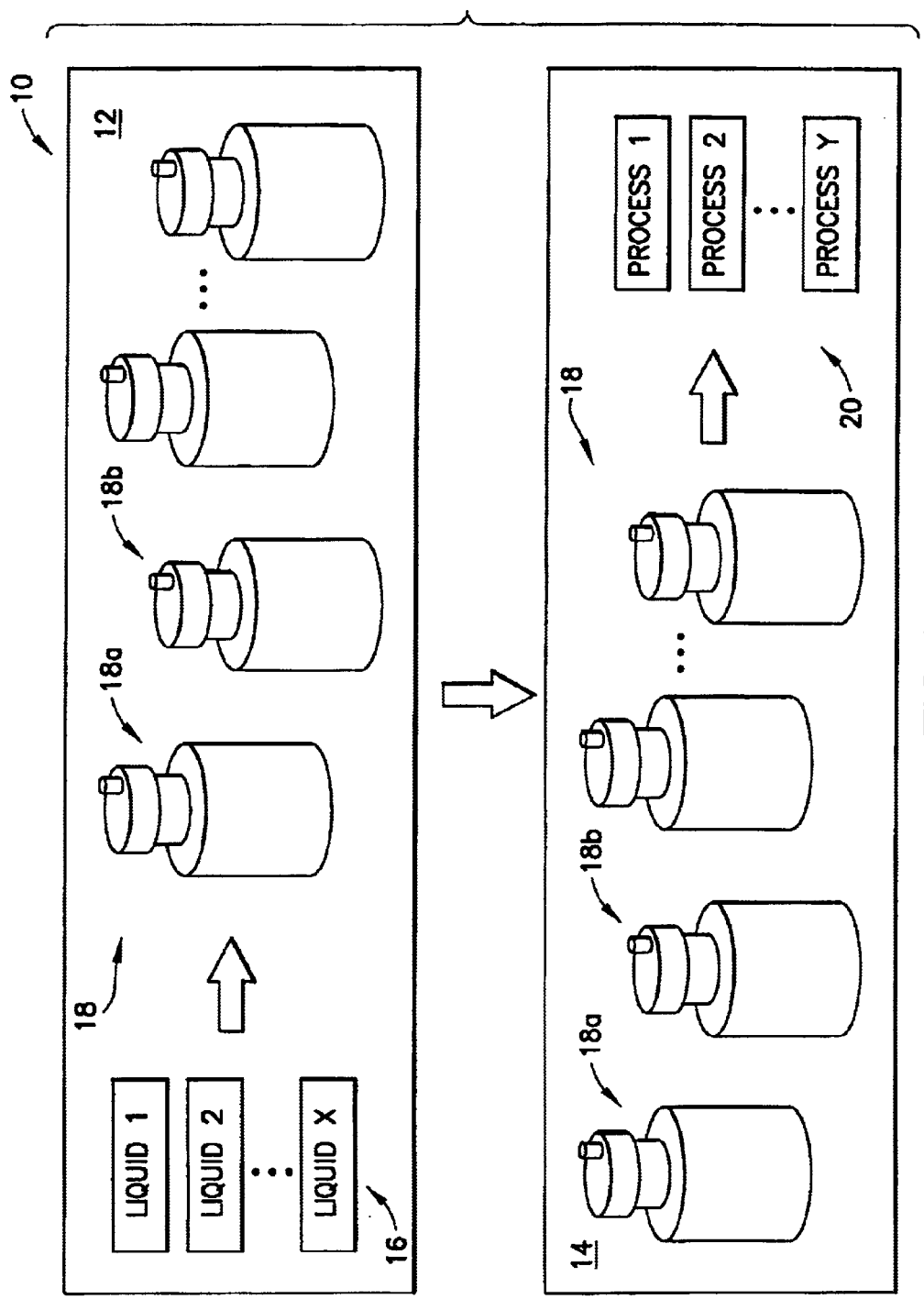
FIG. 1 shows a system for storing, dispensing and processing liquids in accordance with the present invention.

FIG. 1 shows system 10 for storing, dispensing and processing liquids in accordance with the present invention. System 10 includes filling system 12 and processing system 14.

Filling system 12 includes a plurality of liquids 16 and containers 18. In operation of filling system 12, liquids 16 are dispensed into containers 18. Liquids 16 are typically liquid chemicals including acids; solvents; bases; photoresists; dopants; inorganic, organic, and biological solutions; pharmaceuticals; and radioactive chemicals. Filling system 12 tracks which of liquids 16 is placed into which containers 18 so that liquids 16 in containers 18 can be identified later, as will be discussed more fully below. After filling of containers 18 has been completed, containers 18 are transported to processing system 14.

Processing system 14 includes a plurality of containers 18 and processes 20. In operation of processing system 14, liquids 16 contained in containers 18 are used in processes 20. For example, containers 18 may contain a liquid chemical such as photoresist for use in the manufacturing of integrated circuits. Processing system 14 reads containers 18 to determine which liquids 16 are contained within them so that the proper liquid 16 is used in the proper process 20, as will be discussed more fully below.

Figure 2:
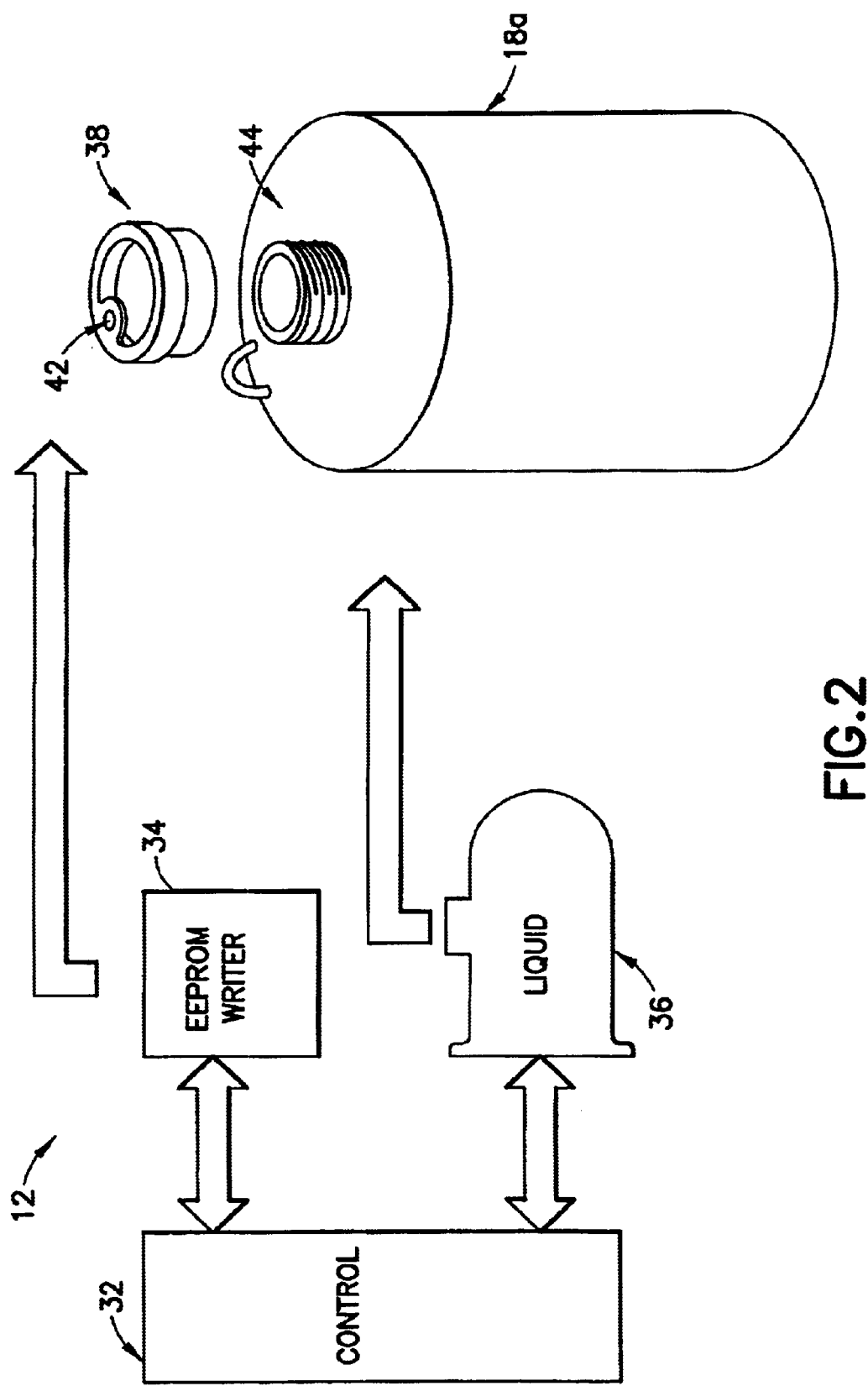
FIG. 2 shows a filling system for filling a container with liquid.

FIG. 2 shows filling system 12 for filling a container with liquid. Filling system 12 includes microprocessor-based control unit 32, electrically erasable programmable read-only memory (EEPROM) writer 34, liquid reservoir 36, cap 38, and container 18a. Control unit 32 is electrically connected to EEPROM writer 34 and liquid reservoir 36. Liquid reservoir 36 is connected to container 18a. Cap 38 includes radio frequency identification (RFID) tag 42. RFID tag 42 includes an EEPROM and a passive radio frequency transponder. EEPROM writer 34 is capable of writing to RFID tag 42 on cap 38.

In operation of filling system 12, control unit 32 regulates dispensing of liquid from liquid reservoir 36 into container 18a. Typically, filling system 12 includes a plurality of liquid reservoirs 36 connected to control unit 32. That is, control unit 32 typically regulates dispensing of a plurality of liquids into a plurality of containers 18. For ease of illustration, a single liquid reservoir 36 and a single container 18a are shown. To begin operation of filling system 12, control unit 32 sends a signal to liquid reservoir 36 instructing liquid reservoir 36 to begin dispensing liquid into container 18a. Liquid reservoir 36 continues dispensing liquid into container 18a until container 18a is filled to an appropriate level. After container 18a is filled, liquid reservoir 36 sends a signal to control unit 32 indicating container 18a is full. Control unit 32 then sends a signal to liquid reservoir 36 to stop dispensing liquid into container 18a.

After container 18a is filled, control unit 32 sends a signal to EEPROM writer 34. This signal contains information about liquid contained in liquid reservoir 36. EEPROM writer 34 subsequently programs the EEPROM contained in RFID tag 42 with information received from control unit 32 in a process known to the art. Information programmed to the RFID tag 42 includes, for example, the type of liquid dispensed into container 18a from liquid reservoir 36, the producer of the liquid contained in liquid reservoir 36, the date of filling of container 18a with liquid from liquid reservoir 36, the date of expiration of the liquid contained in container 18a, and similar useful information. Once container 18a has been filled and RFID tag 42 has been programmed by EEPROM writer 34, cap 38 is secured onto container opening 44 of container 18a. In a preferred embodiment, cap 38 is threadably connected to container opening 44 of container 18. Cap 38 may also be secured onto container opening 44 by, for example, snapping cap 38 onto container opening 44 or vacuum sealing cap 38 onto container opening 44. The method of securing cap 38 onto container opening 44 depends on the properties of the liquid contained in container 18a. After cap 38 has been secured onto container 18a, container 18a is transported to a processing system.

Figure 3:
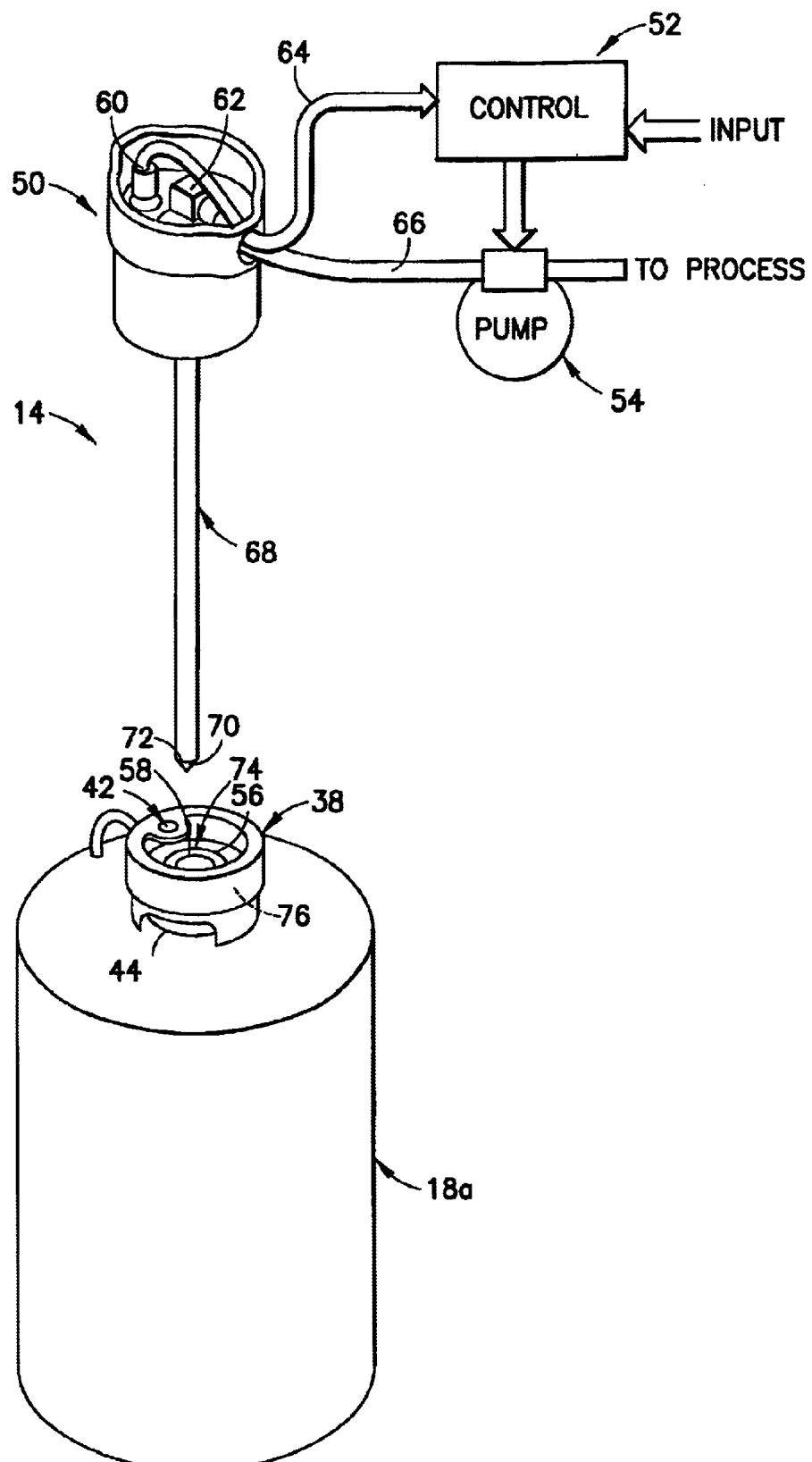
FIG. 3 shows a preferred embodiment of a processing system for dispensing and processing liquid.

FIG. 3 shows a preferred embodiment of processing system 14. Processing system 14 includes cap 38, container 18a, connector 50, control unit 52, and pump 54. Container 18a includes container opening 44. Cap 38 includes RFID tag 42, rupturable membrane 56, and membrane scores 58. Connector 50 includes radio frequency (RF) antenna 60, port adaptor 62, modular antenna line 64, adaptor tube 66, and probe 68. Probe 68 includes lower probe port 70 located adjacent probe tip 72. In a preferred embodiment, cap 38 is threadably connected to container opening 44 of container 18a. After container 18a with cap 38 are transported to the desired location, probe hole 74 and vent hole 76 are exposed. Rupturable membrane 56 is exposed through probe hole 74. Rupturable membrane 56 has membrane scores 58 in its surface. Connector 50 is configured to be interconnected with cap 38.

FIG. 3 shows how the components of processing system 14 are assembled. More specifically, connector 50 is shown being interconnected with cap 38 and container 18a. Probe tip 72 is inserted through probe hole 74 and pressed against rupturable membrane 56 proximate to membrane scores 58. When sufficient pressure is applied on connector 50 toward rupturable membrane 56, probe tip 72 ruptures rupturable membrane 56 along membrane scores 58 allowing probe 68 to be inserted through membrane 56. Continued pressure on connector 50 then allows connector 50 to be moved immediately adjacent cap 38. Probe 68 is then in communication with the interior of container 18a. As such, connector 50 is mounted on container 18a. Adapter tube 66 and port adapter 62 provide a liquid passage from the interior of container 18a to pump 54. When processing system 14 is properly assembled, pump 54 is capable of pumping the liquid in container 18a through port adapter 62 and adapter tube 66 to a manufacturing process, such as the manufacturing of integrated circuits. Typically, processing system 14 includes a plurality of containers 18, a plurality of connectors 50, and a plurality of pumps 54 connected to control unit 52. That is, control unit 52 typically regulates dispensing of liquid from a plurality of containers 18 to a plurality of processes via a plurality of pumps 54. For ease of illustration, a single connector 50, a single container 18a, and a single pump 54 are shown.

The operation of pump 54 is controlled by control unit 52. Control unit 52 may receive input from an operator relating to starting and stopping pump 54. For example, an operator seeking to start pumping the liquid chemical in container 18a to a manufacturing process may input this information to control unit 52.

Control unit 52, however, is also configured to receive signals from RF antenna 60 via either modular antenna line 64 or RF transmissions. In operation of processing system 14, control unit 52 receives input from a process indicating a liquid needed by the process. For example, in the manufacture of integrated circuits, a layer of photoresist may be needed. Control unit 52 sends a signal to RF antenna 60. Probe 68 of connector 50 is then inserted through probe hole 74 until connector 50 is immediately adjacent to cap 38. Connector 50 is positioned such that RF antenna 60 is located adjacent RFID tag 42. A signal requesting the information stored in the EEPROM of RFID tag 42 is then transmitted from RF antenna 60 to RFID tag 42. The signal is received by the passive RF transponder contained in RFID tag 42. The signal received by the transponder activates RFID tag 42. Subsequently, information stored on the EEPROM contained in RFID tag 42 is read from the EEPROM to the transponder. The transponder then transmits the information contained on the EEPROM to RF antenna 60. RF antenna 60 sends the information received from RFID tag 42 to control unit 52 via modular antenna line 64 or via a RF transmission. Control unit 52 compares information received from RF antenna 60 to information about the liquid needed by the process, and controls pump 54 accordingly. That is, if container 18a contains an undesired or unexpected liquid, control unit 52 will disable pump 54. Conversely, if container 18 contains an expected and desired liquid, control unit 52 will enable pump 54.

Consequently, when processing system 14 is not properly assembled and an operator, believing that processing system 14 is properly assembled, inputs information to start pump 54, pump 54 will not operate. In this way, processing system 14 prevents the accidental operation of an improperly assembled system. This will prevent delivery of an improper liquid to a process.

Figure 4:
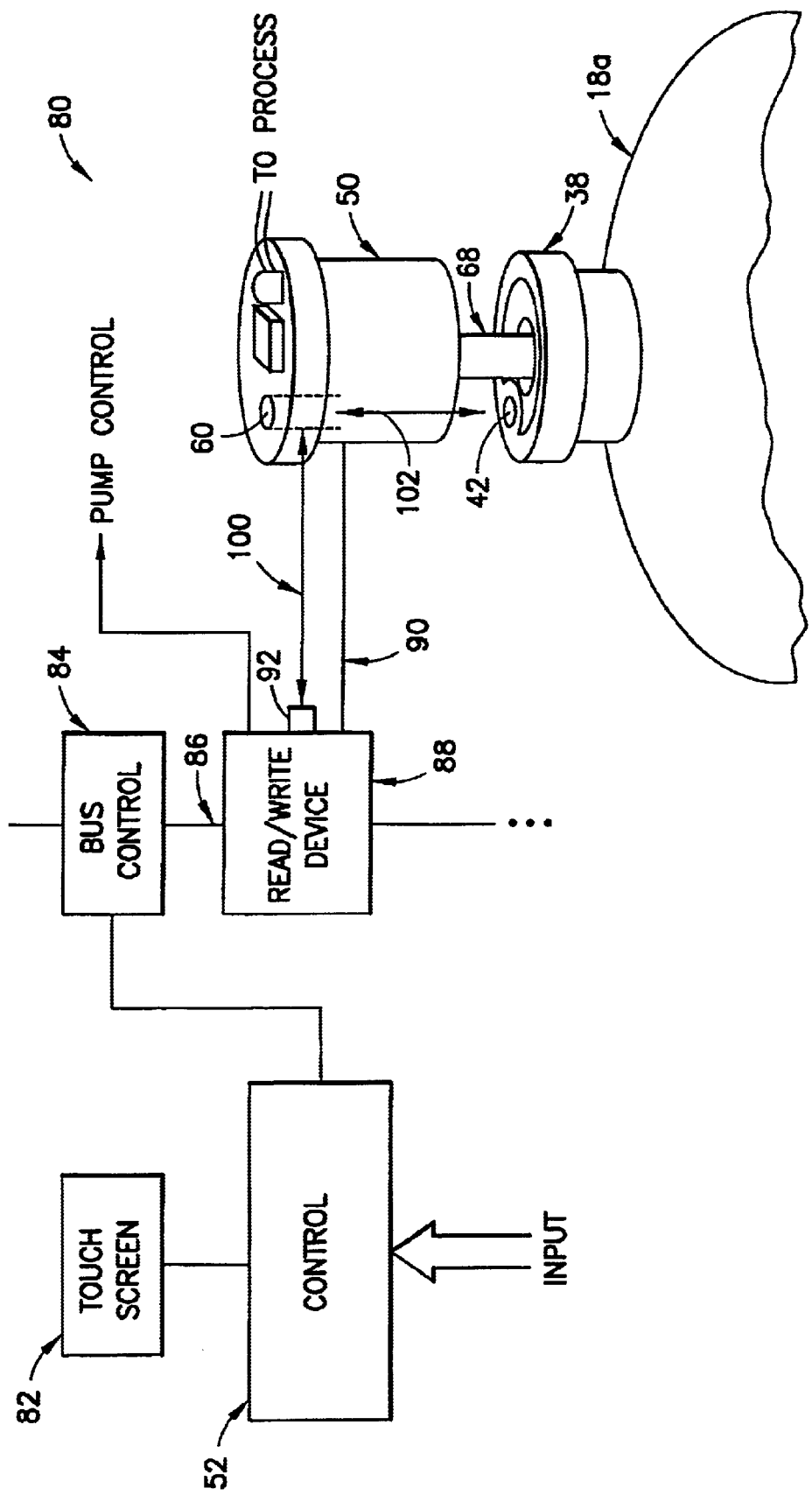
FIG. 4 shows a user-interface in the processing system for dispensing and processing liquid shown in FIG. 3.

FIG. 4 shows a preferred embodiment of user-interface 80 in processing system 14 for dispensing and processing liquid shown in FIG. 3. User interface 80 includes touch screen 82, microprocessor-based control unit 52, bus control unit 84, communication bus 86, read/write devices 88, connector 50, cap 38, and container 18a. Touch screen 82 is connected to control unit 52. Control unit 52 is connected to bus control unit 84, typically via an Ethernet or other serial communications cable. Control unit 52 also receives input from a process. Bus control unit 84 is connected to read/write device 88 via communication bus 86. Read/write device 88 is connected to connector 50 via modular antenna line 90. Read/write device 88 may also communicate with connector 50 through remote antenna 92. Connector 50 communicates with RFID tag 42 on cap 38 via RF antenna 60 using radio frequency transmissions.

For simplicity of illustration, FIG. 4 shows a single connector 50 connected to communication bus 86 through read/write device 88. In a typical system, a plurality of read/write devices 88 are connected to communication bus 86, each read/write device 88 connected to different connectors 50 coupled with containers 18 containing different liquids. Containers 18 are typically situated in a plurality of drawers, each drawer containing a plurality of positions. Each position is configured to hold one container 18. In operation of user-interface 80, each of containers 18 is graphically displayed on touch screen 82 in its corresponding drawer and position within the drawer. For example, in a system having two drawers and four positions within each drawer, container 18a positioned in the second position of the first drawer is graphically displayed on touch screen 82 in the second position of the first drawer. When connector 50 is matched properly with container 18a (as described above), the graphic representation of container 18a on touch screen 82 is displayed in a first color, typically green. This indicates to an operator that the liquid contained in container 18a is ready for dispensing to a process. Conversely, if connector 50 is matched improperly with container 18a (as described above), the graphic representation of container 18a on touch screen 82 is displayed in a second color, typically red, and a warning message appears on touch screen 82. This indicates to the operator that the liquid contained in container 18a will not dispense to a process until the mismatch is corrected.

When container 18a needs to be replaced (for example, when container 18 is empty), the operator removes container 18a from its position. Touch screen 82 then graphically displays container 18a, along with the drawer number and position number of container 18a. The operator then exchanges container 18a for new container 18b, and couples connector 50 with new container 18b. If connector 50 is matched properly with new container 18b (as described above), all containers 18 are displayed on touch screen 82 in the first color. If connector 50 is matched improperly with new container 18b (as described above), new container 18b is displayed on touch screen 82 in the second color and a warning message appears on touch screen 82.

Touch screen 82 also allows the operator to choose from a variety of operations using RFID tag 42. Each operation is selectable from a button on touch screen 82 which corresponds to each operation. For example, an operator may view information stored on RFID tag 42 about liquid contained in containers 18, record information to RFID tag 42 about liquid in containers 18 (such as when the liquid is installed into its proper drawer and position, the shelf life of the liquid, what process the liquid is used in, when the liquid is used in a process, how much of the liquid is used in a process, etc.), or enable probe 68 for dispensing liquid from containers 18. The operator touches the button on touch screen 82 corresponding to a desired operation. Touch screen 82 sends the selection made by the operator to control unit 52. Control unit 52 subsequently commands bus control unit 84 to perform the selected operation. The selected operation is performed, and the result is displayed on touch screen 82.

As an example, the operator may desire to view information stored on RFID tag 42 about liquid in container 18a. The operator first pushes the button on touch screen 82 corresponding to this operation. Touch screen 82 sends this selection to control unit 52. Control unit 52 then commands bus control unit 84 to access RFID tag 42 on container 18a. To access RFID tag 42, bus control unit 84 sends a signal along communication bus 86 to the read/write device accessing RFID tag 42: read/write device 88. Read/write device 88 then accesses RF antenna 60, either via modular antenna line 90 or a RF transmission via antenna 92. In this preferred embodiment, separation 100 between antenna 92 and RF antenna 60 is typically less than five meters for successful RF communication. Next, RF antenna 60 transmits a signal to RFID tag 42. In this preferred embodiment, separation 102 between RF antenna 60 and RFID tag 42 is typically less than ten millimeters for successful RF communication. The signal is received by the passive RF transponder contained in RFID tag 42. The signal activates RFID tag 42 and the requested information is accessed from the EEPROM contained on RFID tag 42. The requested information is then read from the EEPROM by the transponder, and the transponder transmits the information back to RF antenna 60. RF antenna 60 then sends the information to read/write device 88 either via modular antenna line 90 or via RF transmissions to antenna 92. The information is sent along communication bus 86 to bus control unit 84, which in turn sends the information to control unit 52. Once received by control unit 52, information about the liquid in container 18a is displayed on touch screen 82.

The liquid dispensing system of the present invention prevents the accidental operation of an improperly assembled system by storing liquid in a container having a cap with a radio frequency identification tag containing electrically erasable programmable read-only memory. (EEPROM). The EEPROM stores information about the liquid contained in the container. In a processing system, the information contained on the EEPROM can be accessed to prevent the accidental dispensing of an improper liquid and to maintain a database of the liquids used in a process. Also, additional information about the liquid can be written to the EEPROM in the processing system, such as when the liquid is used in a process and how much of the liquid is used in a process. Furthermore, the present invention allows for a standardization of the cap, container, and connector, since the control system now responds to information read from the cap rather than upon sensing a physical connection. This allows for a reduction in the amount of hardware that was necessary to accommodate the physical connectability safety feature of prior art systems.

Although the present invention has been described with reference to preferred embodiments, workers skilled in the art will recognize that changes may be made in form and detail without departing from the spirit and scope of the invention. For example, other forms of electronic storage maybe used on RFID tag 42, such as erasable programmable read-only memory (EPROM), programmable read-only memory (PROM), and random-access memory (RAM). Also, the components of processing system 14 which communicate using radio frequencies may be configured to communicate using other areas of the electromagnetic spectrum, such as those in the areas of cellular or infrared communications.

What is claimed is:

1. A storage and dispensing system for storage and dispensing of liquid, comprising:
    a portable container arranged for holding liquid and including a container opening;
    a cap securable to the container opening and including a radio frequency identification tag in the cap, the cap (i) being arranged when secured to the container opening to seal the container for containment of liquid therein, (ii) including a rupturable membrane therein, and (iii) being engageable with a connector including a connector head and probe extending therefrom, wherein the probe is insertable through the rupturabte membrane into the container, and wherein the probe has a liquid flow passage therethrough;
    a connector including a connector head and a probe extending therefrom, wherein the probe has a liquid flow passage therethrough, and the connector is arranged for flow of liquid from the container through the probe to a location exterior of the container when pumping action is applied to the connector;
    the connector head including an antenna arranged to communicate (i) with the radio frequency identification tag in the cap when the connector bead is engaged with the cap, and (ii) with a controller arranged to control the pumping action in accordance with information contained in said radio frequency identification tag in said cap, and communicated by the antenna to the controller.

2. The storage and dispensing system of claim 1, wherein the cap when engaged with the connector head places the antenna in contact with the radio frequency identification tag.

3. The storage and dispensing system of claim 1, wherein the cap includes a central probe hole having the rupturable membrane associated therewith, so that the probe can be inserted through the probe hole and rupture the rupturable membrane when the cap is engaged with the connector.

4. The storage and dispensing system of claim 1, wherein the antenna and the radio frequency identification tag in the cap are separated by a distance of less than 10 millimeters, when the connector is engaged with the cap.

5. The storage and dispensing system of claim 1, further comprising liquid in said container.

6. The storage and dispensing system of claim 5, wherein said liquid comprises a liquid material selected from the group consisting of acids, solvents, bases, photoresists, dopants, inorganic solutions, organic solutions, biological solutions, pharmaceuticals and radioactive chemicals.

7. The storage and dispensing system of claim 5, wherein the liquid comprises photoresist material.

8. The storage and dispensing system of claim 1, wherein the antenna comprises a radio frequency antenna.

9. The storage and dispensing system of claim 1, wherein the cap is threadably connected to the container opening.

10. The storage and dispensing system of claim 1, wherein the cap is snapably secured to the container opening.

11. The storage end dispensing system of claim 1, wherein the cap is vacuum sealed onto the container opening.

12. The storage and dispensing system of claim 1, further comprising a controller arranged to control the pumping action in accordance with information contained in the radio frequency identification tag in the cap, and communicated by the antenna to the controller.

13. The storage and dispensing system of claim 12, wherein the controller includes a read/write device.

14. The storage and dispensing system of claim 13, wherein the read/write device includes a second antenna.

15. The storage and dispensing system of claim 14, wherein the second antenna comprises a modular antenna line interconnecting the read/write device and the antenna of the connector head.

16. The storage and dispensing system of claim 14, wherein the second antenna comprises a radio frequency antenna.

17. The storage and dispensing system of claim 16, wherein the radio frequency second antenna of the read/write device is separated from the connector head antenna by a distance of less than 5 meters.

18. The storage and dispensing system of claim 12, wherein the controller comprises a user interface including a touch screen for operator input to said controller.

19. The storage and dispensing system of claim 18, wherein the touch screen is arranged for operator input of information including at least one information input selected from the group consisting of:
    installation time of the container;
    shelf life of liquid in the container;
    process utilization of the liquid in the container;
    when the liquid in the container is used; and
    how much of the liquid in the container is used.

20. The storage and dispensing system of claim 12, wherein the controller is arranged to generate a visual output indicative of matching of liquid in the container to a liquid requirement of a liquid-using process.

21. The storage and dispensing system of claim 20, wherein the controller is arranged to generate a visual output indicative of a mismatch of liquid in the container to a liquid requirement of a liquid-using process.

22. The storage and dispensing system of claim 12, wherein the controller is arranged to generate (i) a first visual output indicative of matching of liquid in the container to a liquid requirement of a liquid-using process, and (ii) a second visual output indicative of a mismatch of liquid in the container to a liquid requirement of a liquid-using process, wherein the matching or mismatch are indicated by differently colored first and second visual outputs.

23. The storage and dispensing system of claim 22, wherein the first visual output includes a green colored output display and the second visual output includes a red colored output display.

24. The storage and dispensing system of claim 12, further comprising a pump operatively coupled to the controller to apply said pumping action to the connector, wherein the controller is arranged to modulate said pumping action of the pump in response to information inputted to the controller including at least one information input selected from the group consisting of (i) information contained in the radio frequency identification tag in the cap of the container; (ii) information inputted by an operator to the controller, and (iii) information inputted to the controller from a liquid-using process to which liquid from the container can be dispensed.

25. The storage and dispensing system of claim 1, wherein the system further comprises a pump operatively coupled to the probe for pumping liquid from the container through the flow passage of the probe and out of the container.

26. A liquid storage and dispensing system, comprising:
    a cylindrical vessel having a top opening;
    a cap matably engaged with the top opening of the vessel, the cap including an RFID tag on a peripheral portion of the cap, and a central opening in the cap through which a liquid dispensing tube of a connector head may be inserted to place the liquid dispensing tube in contact with liquid in the vessel;

a rupturable membrane closing the opening in the cap, the rupturable membrane being rupturable when the liquid dispensing tube is inserted through the opening to place the liquid dispensing tube in contact with liquid in the vessel;

an integrated circuit manufacturing liquid in the vessel;

a connector including a liquid dispensing tube and a connector main body to which the liquid dispensing tube is connected, the connector main body having an antenna therein which is placed into information transmission relationship with the RFID tag when the liquid dispensing tube is inserted through the rupturable membrane and the connector main body is engaged with the cap, whereby information from the RFID tag can be transmitted by the antenna to a signal processor by a wire or wireless connection.

* * * * *